United States Patent
Tanaami

[19]

[11] Patent Number: 5,978,095
[45] Date of Patent: Nov. 2, 1999

[54] CONFOCAL MICROSCOPIC EQUIPMENT

[75] Inventor: Takeo Tanaami, Tokyo, Japan

[73] Assignee: Yokogawa Electric Corporation, Tokyo, Japan

[21] Appl. No.: 09/069,317

[22] Filed: Apr. 29, 1998

[30] Foreign Application Priority Data

May 15, 1997 [JP] Japan ................................. 9-125481

[51] Int. Cl.$^6$ ................................................ G02B 21/00
[52] U.S. Cl. ...................................... 356/445; 359/368
[58] Field of Search ............................ 356/445; 359/368

[56] References Cited

U.S. PATENT DOCUMENTS 5,239,178  8/1993  Derndinger et al. ................ 250/234
5,381,236  1/1995  Morgan ................................ 356/376
5,659,420  8/1997  Waikai et al. ....................... 359/368

Primary Examiner—Richard A. Rosenberger
Attorney, Agent, or Firm—Moonray Kojima

[57] ABSTRACT

A confocal microscopic equipment comprising a light source, a flat plate provided with a plurality of apertures, a detector comprising a plurality of detecting cells, a beam splitter that makes the light beam from the light source incident to the flat plate by transmission or reflection and makes the output light from the flat plate plate to be reflected or transmitted to the detector, and an objective lens that makes the light beam passed through the apertures of the flat plate form light images on the sample and makes the return light from the sample focus on the flat plate, wherein the distance between light spots focused on the detector is equal to or less than twice the distance between the detecting cells, and whereby scanning of an irradiating light beam is not required.

12 Claims, 4 Drawing Sheets

CONFOCAL MICROSCOPIC EQUIPMENT

BACKGROUND OF THE INVENTION

1. Field of the Invention

This invention relates to confocal microscopic equipment which can measure the confocal image of a sample at high speed; and more particularly, to such equipment which does not require scanning of an irradiating light beam.

2. Description of the Prior Art

The confocal microscopic equipment has a resolution in the direction of the light axis and a resolution on the surface of a smaple by scanning an irradiating light beam on the sample and detecting the light beam reflected from the sample through pinholes or the like. FIG. 1 shows an example of such a conventional confocal microscopic equipment, wherein the output light beam of laser 1 is transmitted through beam splitter 2 and is focused on sample 7 via mirror scanners 3 and 4, and objective lens 6. The return light, including reflected light, fluorescent light, etc, from sample 7, is made to be incident on beam splitter 2, via objective lens 6, mirror 5, and mirror scanners 4 and 3. The return light is reflected by beam splitter 2, passed through pinholes 8 and is made incident on detector 9.

The output light beam from laser 1 is focused at a point on sample 7 by means of objective lens 6. By detecting the return light, resulting from the output light beam from laser 1 focused at a point on sample 7 via pinhoes 8, a confocal effect is obtained. That is, a point in the three dimensional space can be precisely observed. Furthermore, a confocal image of the surface of sample 7 is obtained by scans in the x-axis and y-axis directions on the surface of sample 7 using mirror scanners 3 and 4. As a result, it is possible to obtain a confocal image by scanning the focused light on sample 7 using mirror scanners 3 and 4 and detecting the return light through pinholes 8.

FIG. 2 shows another conventional confocal microscopic equipment, such as disclosed in Japan Unexamined application SN 93/60980, wherein the output light beam from laser 1*a* is made to be incident on micro-lens disk 10, wherein micro-lenses are provided as a focusing means. The output light mean is then focused on each pinhole in disk 12, wherein the pinholes are provide as apertures, via beam splitter 11, which is a light branching means, by micro-lenses provided in disk 10. The light beam, that passes through the pinholes in disk 12, are made to be incident on sample 14, via objective lens 13. The return light beam, such as reflected light and fluorescent light, from sample 14 are made to be incident again on pinhole disck 12 via objective lens 13. The incident light beams that pass through each pinhole in the disk 12, are reflected by beam splitter 11, and are made to be incident on detector 16 via relay lens 15. In addition, micro-lens disk 10 and pinhole disk 12 are fixed on the same shaft and are rotated synchronously by motor 17 attached to the shaft.

The output of laser 1*a* scans the surface of sample 14 by passing through the micro-lenses in disk 10 and pinholes in disk 12, both disks being rotated concurrently. The reflected light beams from sample 14 are detected by detector 16 and thus a confocal image is obtained thereby.

Each micro-lens in disk 10 focuses the incident light beams on each pinhole of disk 12 via beam splintter 11. That is, the efficiency of use of the incident light beam from laser 1*a* is improved by arranging the pinholes at the focal points of the micro-lenses. In addition, there are approximately 1,000 pinholes in the detectable range, i.e. the field of view, of the detector 16. Hence, light beams transmitted through each pinhole constitute multi-beams that irradiate sample 14. Since individual beam scanning ranges become smaller for this reason, high speed scanning becomes possible.

However, disadvantageously, in the example of FIG. 1, the configuration of mirror scanners 3 and 4 of the scanning means is complex, thereby resulting in an expensive apparatus, and making miniaturization thereof difficult. Although the example of FIG. 2 can scan at high speed, since a definite distance exists between the beams, disadvantageously, beam scanning is necessary for covering the distances on a confocal image, and the time required for such beam scanning limits the pickup speed for confocal images. For example, it takes about 1 ms to scan one confocal image. Thus, a confocal image cannot be picked up within 1 ms even when a high speed camera is used.

SUMMARY OF THE INVENTION

Accordingly, an object of the invention is to overcome the aforementioned and other deficiencies, problems and disadvantages of the prior art.

Another object is to provide a confocal microscopic equipment which does not require scanning of the irradiating light beam.

DETAILED DESCRIPTION OF THE PREFERRED EMBODIMENTS

Figure 1:
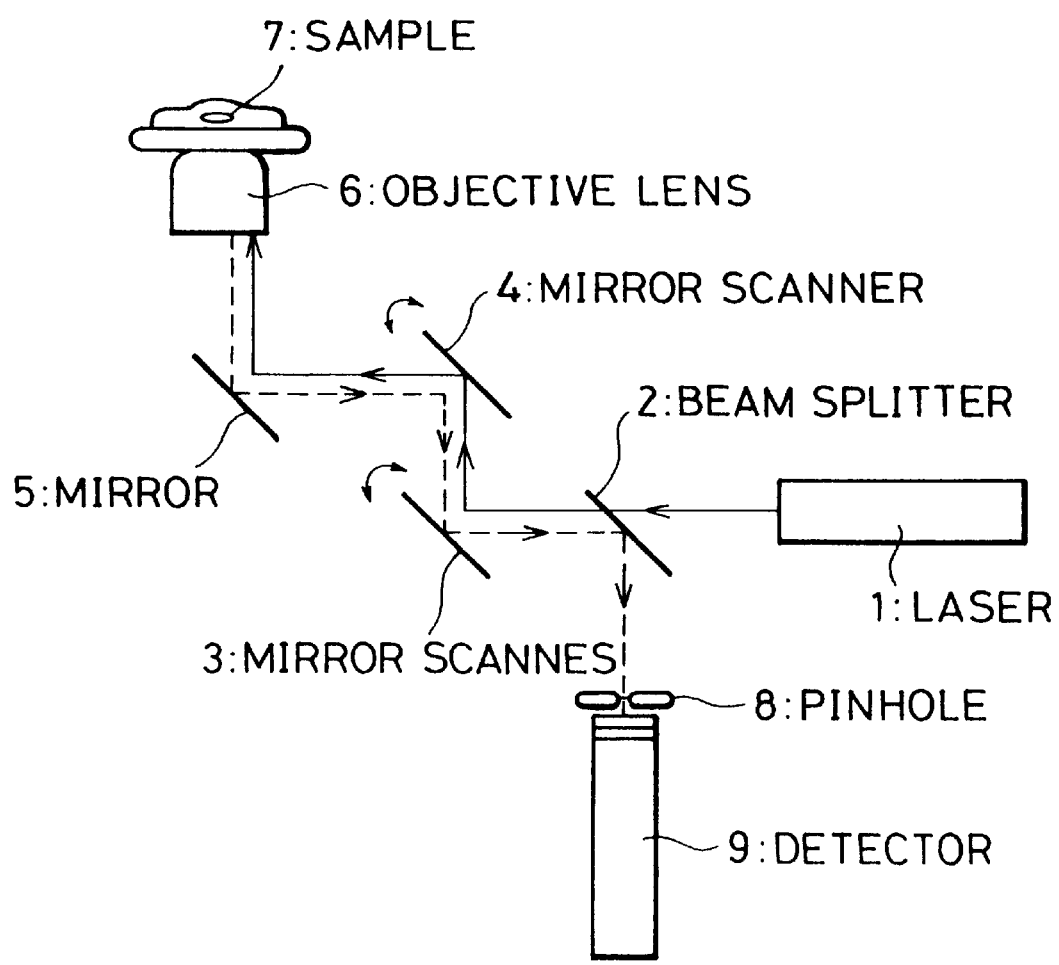
FIG. 1 is a block diagram depicting a conventional confocal microscopic equipment.
Figure 2:
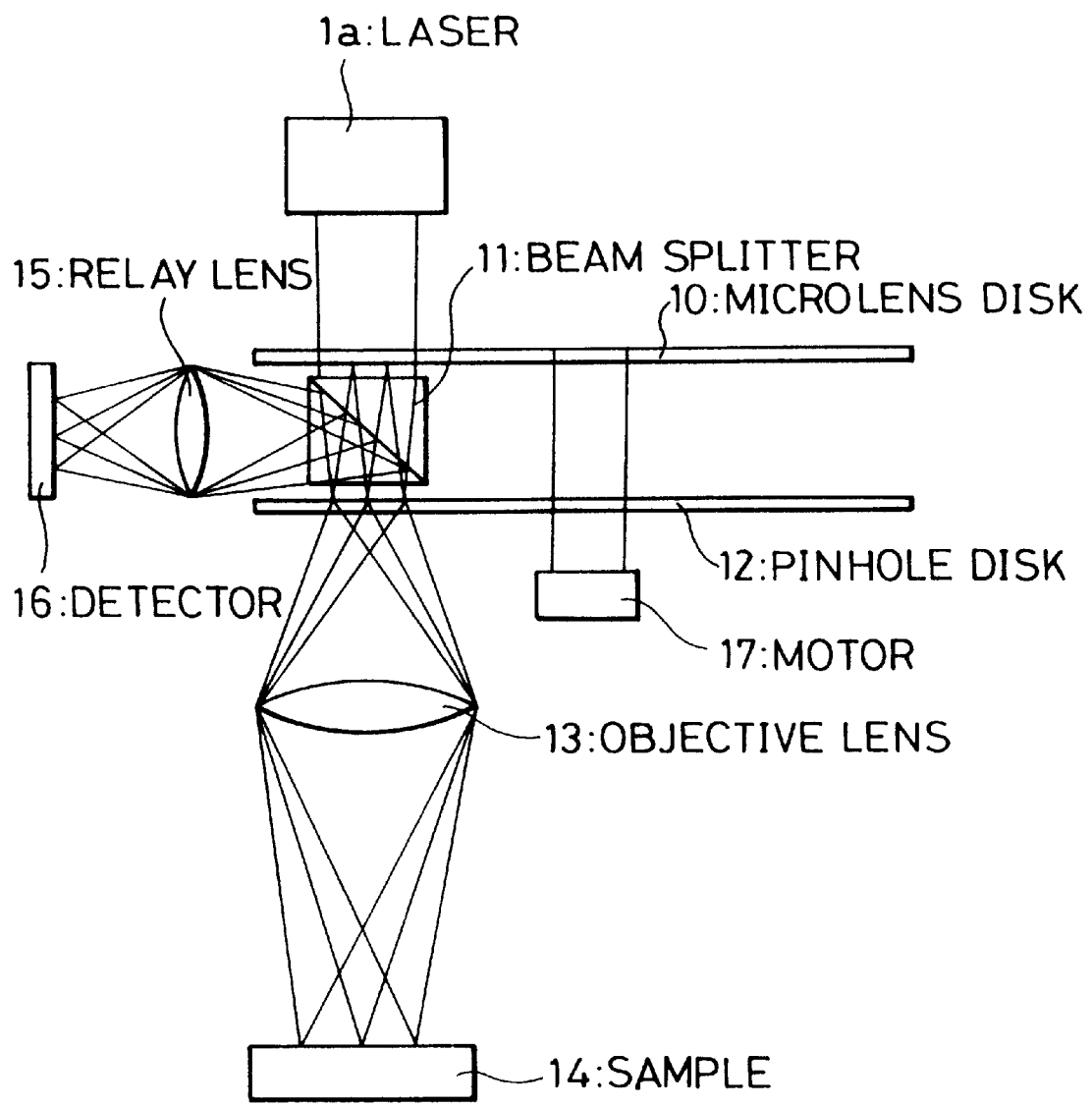
FIG. 2 is a block diagram depicting another conventional confocal microscopic equipment.
Figure 3:
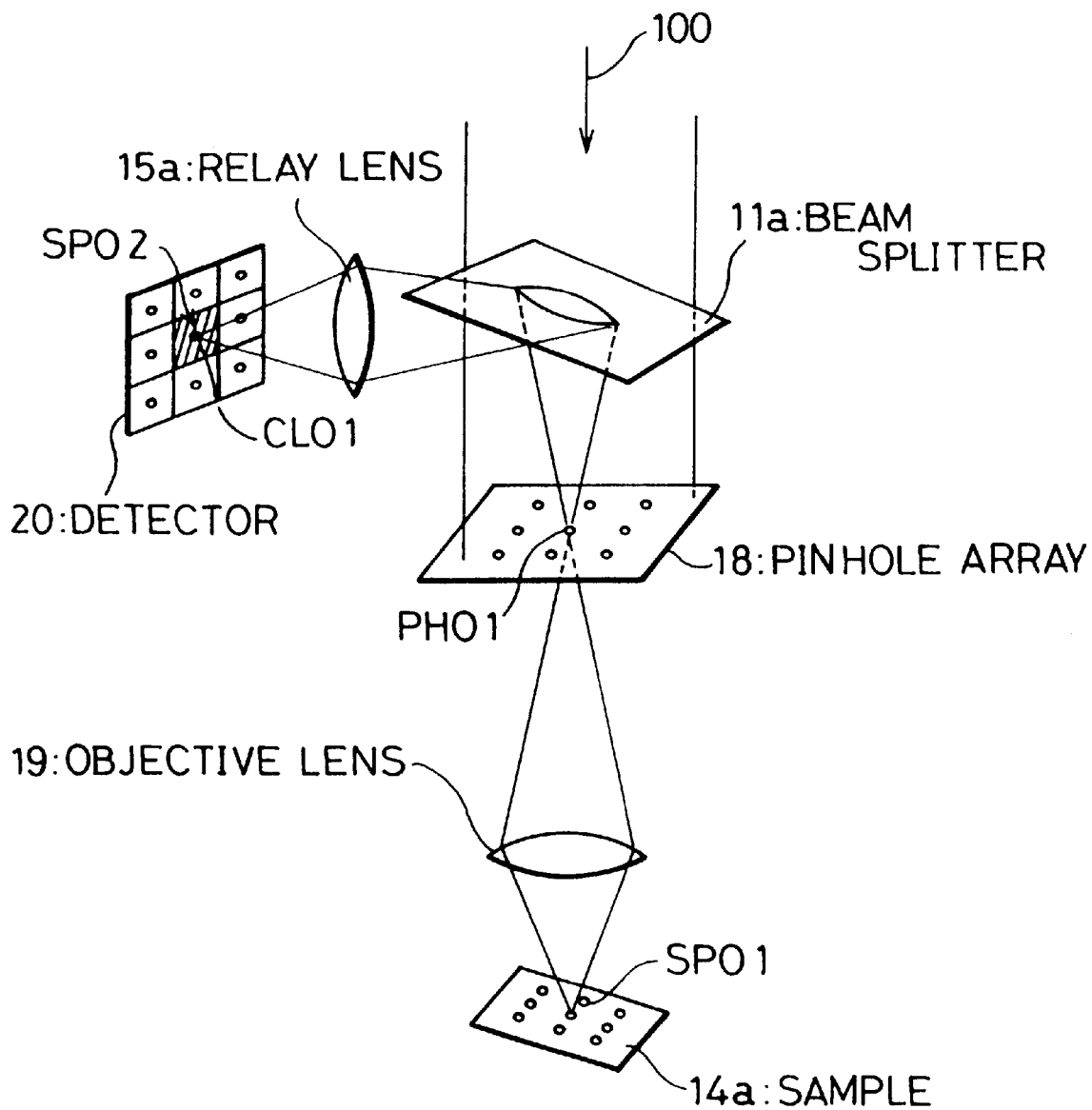
FIG. 3 is a diagram depicting an illustrative embodiment of the invention.

FIG. 3 shows an illustrative confocal microscopic equipment wherein incident light 100 is transmitted through beam splitter 11*a* and is made to be incident on pinhole array 18 wherein a plurality of pinholes is provided as apertures. The incident light passes through the plurality of pinholes and forms light spots on sample 14*a* by being focused thereon by objective lens 19. The return light from sample 14*a*, such as reflected light and fluorescent light, passes again through the pinholes of pinhole array 18, as focused by objective lens 19, and is then made to be incident on beam splitter 11*a*. Beam splitter 11*a* reflects the incident light and the reflected light is made to be incident on detector 20 (which may be, for example, a charge coupled device (CCD) camera) via relay lens 15*a*.

The operation of the embodiment of FIG. 3 is as follows, based on the assumption that nine pinholes are provided in pinhole array 18, that detector 20, such as a CCD camera, also comprises nine detecting cells, and that pinhole array 18 is positioned on an image forming plane of objective lens 19. Incident light, that passes through a pinhole shown as PHO1 in pinhole array 18, forms a light spot on sample 14*a* shown as SPO1. The return light from the light spot SPO1 passes again through pinhole PHO1 and forms a light spot shown as SPO2 on detector 20 by means of the relay lens 15a. If it is assumed that the magnification of objective lens 19 is 100 and the size of the light spot SPO1 is 1 $\mu$m, then the size of the light spot on the image forming plane becomes 100 $\mu$m. Accordingly, the size of the light spot SPO2 formed on the detector 20 by relay lens 15a and having a magnification factor of one is also 100 $\mu$m.

Ordinarily, the size of a detecting cell of detector 20, such as a CCD camera, is about 5 to 10 $\mu$m. If light spots, each being of size 100 $\mu$m, are focused on detector 20, then, gaps between adjacent light spots are identified by means of detector 20. Thus, it becomes necessary to scan the light spots formed on sample 14a in order to cover the gaps on a confocal image.

On the other hand, if the magnifiction of the objective lens 19 is assumed to be one, then the size of a light spot on the image forming plane is still 1 $\mu$m, and the size of the light spot focused on the detector 20 is also 1 $\mu$m. For example, since the size of each detecting cell, comprising detector 20, and shown as CLO1 is about 5 to 10 $\mu$m, a light spot focused on SPO2 is collected within the area of the detecting cell shown as CLO1.

If it is assumed that the distance between the detecting cells of detector 20 is 5 $\mu$m and the distance between the light spots to be focused on the detector 20 is 5 $\mu$m, then the distance between the detecting cells corresponds to the distance between the light spots at a ratio of 1:1. Thus, each light spot focused on the detector 20 is collected within the area of each corresponding cell of detector 20,respectively. In this cell, detector 20 cannot recognize the gaps between the light spots. In other words, the gaps to be covered by scanning the light spots are apparently non-existent on a confocal image plane. That is to say, advantageously, with the invention, a confocal image is obtained without scanning the light spots.

Accordingly, scanning of an irradiating light beam is made unnecessary by the following features of the invention, namely, (1) by arranging the distance between the detecting cells of the detector 20 to be a corresponding one to one to the distance between the light spots focused on the detector 20, and (2) by making each light spot to be focused within the area of each corresponding detecting cell of the detector 20. Advantageously, this makes the construction of such equipment simpler, reduces the cost, and facilitates miniaturization thereof. Since the time required for scanning is eliminated, there is no longer any limitation of pickup speed for the confocal images, and hence, higher speed operation is made possible.

Furthermore, although the ratio of the distance between the detecting cells of the detector 20 to the distance between the light spots focused on the detector 20 is set to be 1:1 in the embodiment of FIG. 3, such ratio is not limited to such value. For example, FIG. 4 shows the relationship between the distance between detecting cells of the detector 20 and the distance between the light spots focused on the detector 20, wherein CL11, CL12, CL13, and CL14 designate the detecting cells of the detector 20, and SP11, SP12 designate the light spots focused on the detector 20, and CWO1 and SWO1 designate the distance between detecting cells and the distance between the light spots, respectively.

Figure 4:
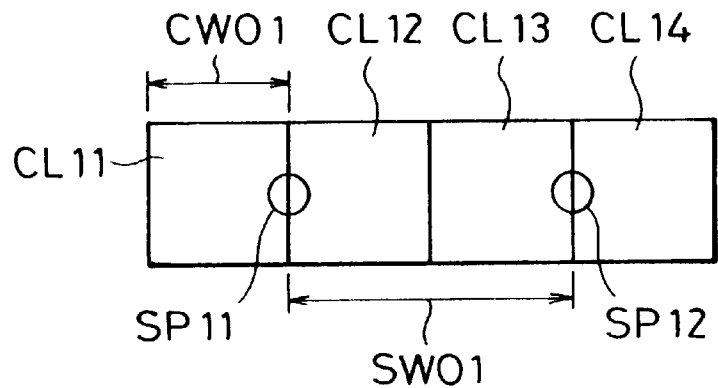
FIG. 4 is a diagram depicting the relationship between the detecting cell distance of the detector and the light spot distance of the light spots focused by the detector.

In FIG. 4, the ratio of the distance between detecting cells and the distance between light spots is 1:2, and one light spot is focused astride two adjacent detecting cells. In other words, onehalf of a light spot is focused within the area of one detecting cell. Even in such a condition since the detector 20 cannot recognize the gap or distance between the light spots, advantageously, a confocal image can be obtained without requiring the scanning of the light spots.

Figure 5:
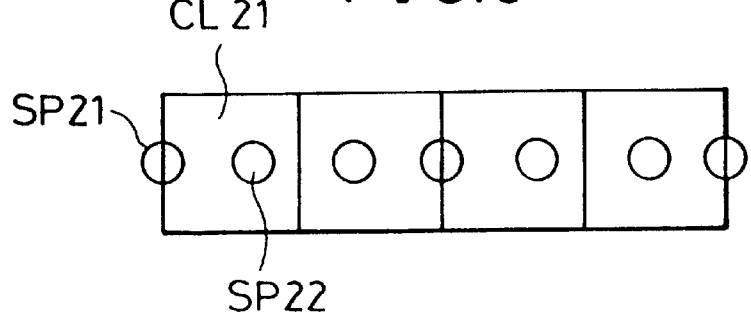
FIG. 5 is a diagram depicting light spots focused within an area of each detecting cell.

In addition, in a similar manner, the number of light spots focused within the area of each detecting cell is not limited to 1. For example, FIG. 5 shows an example of light spots focused within the area of the detecting cells, wherein CL21 designates a detecting cell, and SP21 and SP22 designatre focused light spots. As is apparent from FIG. 5, one and one-half (1.5) light spots are focused on the detecting cell CL21. That is, any number of light spots focused within the area of each detecting cell may be adopted provided that it is a real number. However, it is preferable for the number of light spots focused on a detecting cell to be the same for each detecting cell since different numbers of light spots would tend to result in unevenness of light and shade.

Figure 6:
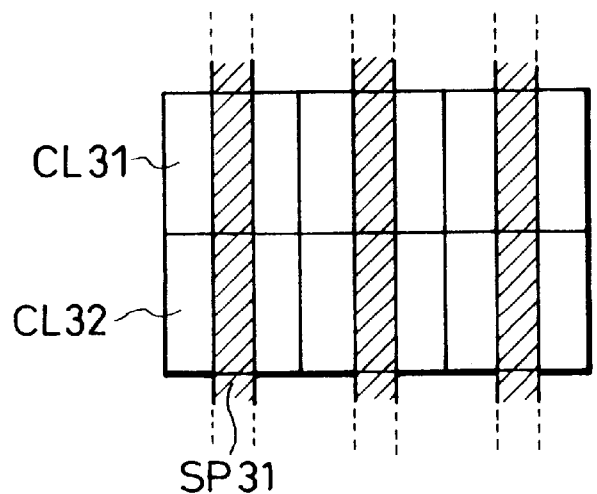
FIG. 6 is a diagram depicting the shape of light spots focused within an area of each detecting cell.

In addition, the shape of the light spots and of the apertures in the pinhole array disk 18 is not limited to be circular. Any other shape can be used, for example, a square shape, an elliptical shape, etc. For example, FIG. 6 shows another example of a shape of light spots focused within the area of each detecting cell, wherein CL31 and CL32 designate detecting cells, and SP31 designates a focused light spot of a slit shape. Even if such a slit shape is used, detector 20 cannot recognize the gap between the light spots (which maybe slits) and so a confocal image is obtained without the requirement of scanning the light spots.

In the embodiment of FIG. 3, the image forming plane of the objective lens 19 is used to dispose the disk 18. However, the image forming plane of the objective lens 19 may also be disposed where a diaphragm for a light source in an illuminating system of a microscope is positioned. Furthermore, although the beam splitter 11a of FIG. 3 transmits the incident light beam 100 and reflects the light from disk 18, the beam splitter 11a may reflect the incident light beam 100 and transmit the light from the disk 18. In addition, although one light spot is focused astride two adjacent detecting cells in FIG. 4, one light spot maybe also focused astride four adjacent detecting cells.

Advantageously, the inventon eliminates the necessity of scanning the irradiating light beams by arranging the distance between the detecting cells and the distance between the light spots on the detector, and by making each light spot focus within the area of a corresponding detecting cell, respectively. This makes construction of the confocal microscopic equipment simpler, reduces costs, and facilitates miniaturization. Since the time required in the prior art for scanning is eliminated by the invention, the prior art limitation set by the pick up speed for confocal imaging is also eliminated thereby resulting in a higher speed operation by the invention. Furthermore, advantageously, the invention is more flexible in design since in the embodiment of FIG. 3, the light collecting means, such as the plate dr disk having the micro-lenses, can be disposed between the light source 100 and the pinhole array 18 so that efficiency of exciting light is improved considerably. Moreover, advantageously, the invention principles disclosed herein can be also applied to other areas of camera useage.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. Confocal microscopic equipment that measures a confocal image of a sample, comprising:

a light source;

a flat plate provided with a plurality of apertures;

a detector comprising a plurality of detecting cells;

a beam splitter that makes light beam from said light source incident to said flat plate through transmission or reflection and makes output light from said flat plate to be reflected or transmitted to said detector; and an objective lens that makes light beam passed through said apertures of said flat plate form light images on said sample and makes return light from said sample focus on said flat plate;

wherein distance between light spots forcused on said detector is equal to or less than twice distance between said detecting cells;

and wherein a light spot focused on said detector is collected astride two or more adjacent detecting cells fo said detector.

2. The equipment of claim 1, wherein number of light spots focused within an area of each detecting cell of said detector is same for each of said detecting cells.

3. The equipment of claim 1, wherein shape of said apertures provided in said flat plate is circular.

4. The equipment of claim 1, wherein shape of said apertures provided in said flat plate is a slit.

5. The equipment of claim 1, wherein said flat plate is disposed in a position of a diaphragm for a light source in an illumination system.

6. The equipment of claim 1, wherein light collecting means is disposed between said light source and said flat plate.

7. Confocal microscopic equipment that measures a confocal image of a sample, comprising:

a light source;

a flat plate provided with a plurality of apertures;

a detector comprising a plurality of detecting cells;

a beam splitter that makes light beam from said light source incident to said flat plate through transmission or reflection and makes output light from said flat plate to be reflected or transmitted to said detector; and an objective lens that makes light beam passed through said apertures of said flat plate form light images on said sample and makes return light from said sample focus on said flat plate;

wherein distance between light spots focused on said detector is equal to or less than twice distance between said detecting cells;

and wherein a plurality of light spots focused on said detector is collected within an area of a detecting cell of said detector.

8. The equipment of claim 7, wherein number of light spots focused within an area of each detecting cell of said detector is same for each of said detecting cells.

9. The equipment of claim 7, wherein shape of said apertures provided in said flat plate is circular.

10. The equipment of claim 7, wherein shape of said apertures provided in said flat plate is a slit.

11. The equipment of claim 7, wherein said flat plate is disposed in a position of a diaphragm for a light source in an illuminating system.

12. The equipment of claim 7, wherein light collecting means is disposed between said light source and said flat plate.

* * * * *